Nov. 5, 1963 M. P. NEWBY 3,109,880
EXTERIORLY THREADED ENCAPSULATED ELECTRONIC MODULE
Filed April 24, 1961

INVENTOR.
MURRELL P. NEWBY
BY Roger W. Jensen
ATTORNEY

United States Patent Office 3,109,880

Patented Nov. 5, 1963

3,109,880

EXTERIORLY THREADED ENCAPSULATED ELECTRONIC MODULE

Murrell P. Newby, Clearwater, Fla., assignor to Minneapolis-Honeywell Regulator Company, Minneapolis, Minn., a corporation of Delaware Filed Apr. 24, 1961, Ser. No. 104,856
4 Claims. (Cl. 174—35)

This invention relates generally to electronic modules and more specifically to a module which has features of good heat conduction, space saving, materials saving and of being electromagnetically and electrostatically shielded from interference signals radiated from other sources.

With the increasing emphasis toward microminiaturization, it is today possible to get many components in a given volume and this number of components per given volume is going to increase rapidly in the future. With the packing of more components in a given volume, heat dissipation problems become more and more severe.

In one embodiment of this invention, an electronic amplifier was constructed using welded module techniques. This amplifier was placed in a threaded mold and encapsulated with a plastic material. The encapsulating material formed an externally threaded module which could be inserted in a threaded opening or recess in a platform gimbal to keep the module out of the way, to provide electromagnetic and electrostatic shielding, and to provide good heat transfer from the components in the amplifier to the large heat sink provided by the gimbal.

It is therefore an object of this invention to provide means for further conserving space by allowing electronic circuitry to be inserted in heat conducting frames and members where strength of the material is not critical.

It is another object of this invention to provide means for dissipating the heat generated by the components contained in microminiaturized electronic circuitry.

It is a further object to provide an electronic module which uses the molding or encapsulating compound to provide a threaded module for insertion into a threaded opening.

Other objects and various advantages and features of the invention may be readily apprehended by reference to the following description taken in conjunction with the appended claims and the accompanying drawings of which:

Figure 1:
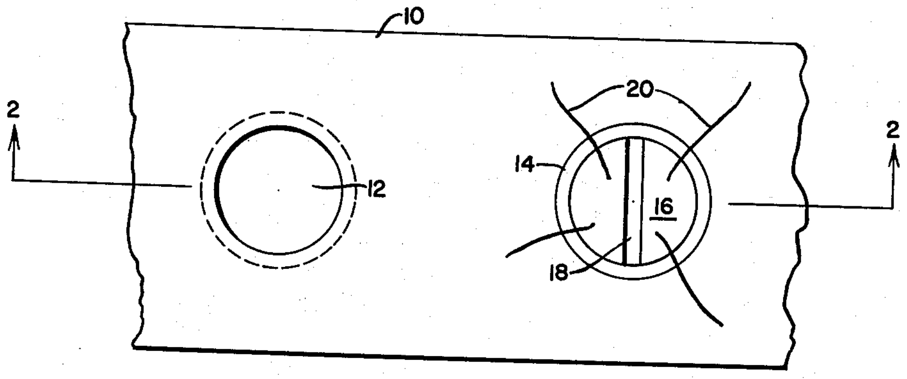
FIGURE 1 is a top view of a portion of a base member showing an empty, threaded opening and also an inserted module.

In FIGURE 1, a portion of a frame member 10 is shown with threaded openings 12 and 14. Frame 10 may be any suitable base such as a gimbal or a multi-gimballed inertial platform. Threaded opening 14 is shown with a module 16 inserted therein. Tool engaging means are provided. As shown, a screw driver slot or indentation 18 is molded or machined in one end of the module 16. The module 16 also has several leads or terminal means generally designated as 20 extending from one end for supplying input and power signals to the module 16 and for providing an output signal from the module.

Figure 2:
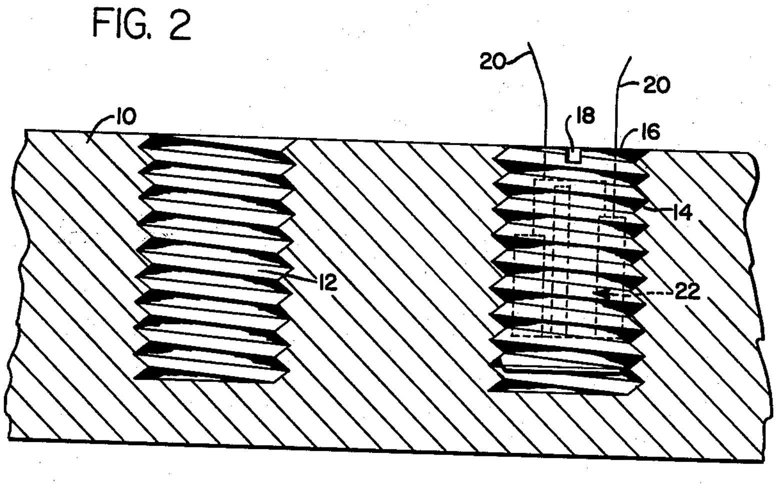
FIGURE 2 is a cross sectional view of the base member shown in FIGURE 1 taken along the line 2—2, with the addition of a hidden view of electronic circuitry within the module.

In FIGURE 2 a cross section of the portion of the frame 10 shown in FIGURE 1 is shown as 10. Threaded openings 12 and 14 are also shown in this cross sectional view. The module 16 is shown inserted in the opening 14 and is shown with a screw driver slot or opening to aid the insertion of the module into the threaded opening 14. The module 16 has the slot 18 and the leads or terminal means generally designated as 20 as shown in FIGURE 1. A hidden view drawing of some of the components in an electronic device and generally designated as 22 is also shown in the module 16.

Depending upon the reason or reasons for using this invention, the frame 10 may be heat conducting, electromagnetic shielding material, or any other material capable of providing a threaded opening, or a combination of heat conducting and electromagnetic shielding material. Most metals will give electrostatic shielding although in some cases the additional feature of electromagnetic shielding may be desired. If the electronic device within the module is capable of dissipating enough heat without being in close contact with the heat conducting material and does not need shielding of any sort, it may be inserted in any threaded opening available for the purpose of keeping the electronic device out of the way. If problems arise due to heat dissipation or sensitivity to magnetic or radio signals, these factors will have to be taken into account in choosing the material of the base 10 within which the module 16 is inserted.

The indentation which is shown as screw driver slot 18 may be any indentation or projection which, when using the appropriate inserting tool, will aid in the insertion of the module 16.

As can easily be seen, many variations of types of threads may be used on the module 16 and in the opening 14 depending upon the various factors with which an individual is concerned when designing the module or electronic device for insertion into a suitable opening.

It is possible of course that the leads 20 could terminate as contacts on portions of the threaded areas or as contacts on the opposite end of the module in such a manner to engage appropriate contacts in either of these positions on the base metal 10.

Although it is necessary to completely insert the module within the hole 14 before soldering or otherwise securing the leads 20 to permanent positions when the module 16 has continuous threads, it is possible that interrupted threads of some type could be placed on the module 16 and in the threaded opening 14 in such a manner that the leads could be soldered and the module 16 be placed in the opening 14 by only a quarter or half revolution in applications where good heat conductivity is not a primary concern.

It is to be understood that the above described arrangements are illustrative of the application of the principles of the invention. Numerous other arrangements may be devised by those skilled in the art without departing from the sphere and scope of the invention.

What is claimed is:

1. In electronic apparatus: electromagnetic shielding metal having a threaded opening therein; a completely encapsulated electronic device disposed within said threaded opening in said electromagnetic shielding metal, said encapsulated device being characterized by having a threaded exterior and by having input, output and power terminal means for operation of said electronic device and being further characterized by having an indentation thereon which is adapted to be engaged by a screw driver; and said metal providing a heat dissipating medium for said encapsulated device when said encapsulated device is disposed within said opening.

2. In a threaded, molded, electronic module adapted for insertion in a threaded opening in a heat conducting material: heat dissipating electronic circuitry having input and output means; and encapsulating means enclosing said electronic circuitry, said encapsulating means being characterized by having threads on an exterior surface thereof, said encapsulating means being further characterized by having tool engaging means therein for the purpose of providing an aid to the insertion of said encapsulating means in the opening in the heat conducting material, and said threads providing a large surface area to aid the dissipation of heat from the electronic module.

3. In a threaded, molded, electronic module adapted for insertion in an opening in an electromagnetic shielding metal: electronic circuitry having input and output means; and plastic means enclosing said electronic circuitry, said plastic means being characterized by having threads on an exterior surface thereof, said plastic means being further characterized by having means therein for the purpose of providing an aid to the insertion of said plastic means in said opening, and said electronic circuitry being situated within said threaded exterior surface.

4. In electronic apparatus: heat conducting material having a threaded opening therein; and encapsulated, heat-dissipating electronic circuitry, said encapsulated electronic circuitry being characterized by having a threaded exterior and by having input and output means for operation of said circuitry, said electronic circuitry being further characterized by being positioned within said threaded exterior for obtaining substantial heat transfer to said heat conducting material, said encapsulated circuitry being adapted for insertion into and movement relative to said heat conducting material, said encapsulated circuitry being disposed in threaded engagement within the threaded opening in said heat conducting material, and said heat conducting material providing a heat dissipating medium for said encapsulated circuitry when said encapsulated circuitry is disposed within said opening.

References Cited in the file of this patent

UNITED STATES PATENTS 2,731,528 Kovacik ---------------- July 17, 1956